Patented Jan. 12, 1943

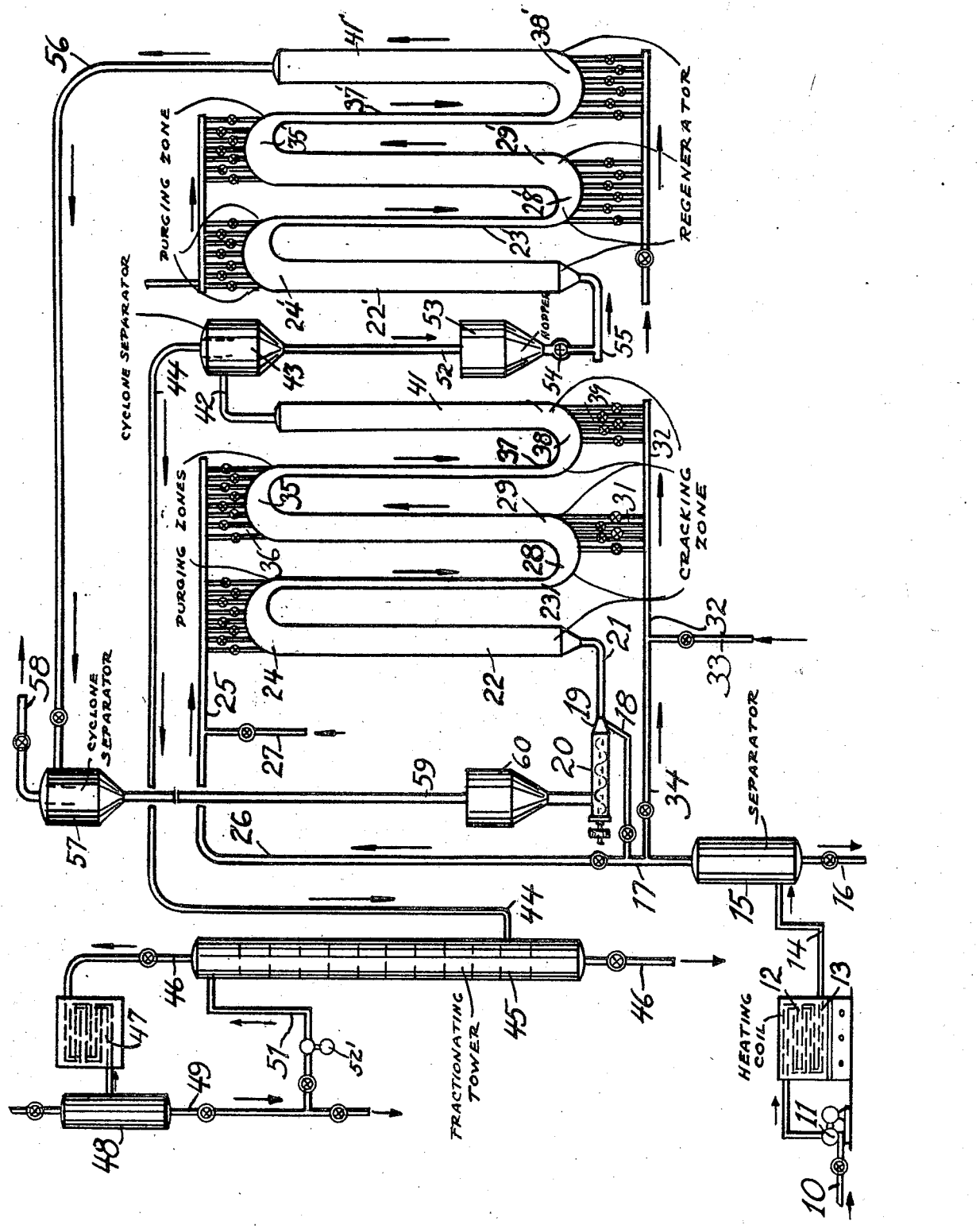

2,307,879

UNITED STATES PATENT OFFICE 2,307,879

CATALYTIC CONVERSION PROCESS

Paul W. Cornell, Pittsburgh, Pa., assignor to Standard Oil Development Company, a corporation of Delaware Application July 12, 1941, Serial No. 402,187

3 Claims. (Cl. 196—52)

This invention relates to a catalytic conversion process and pertains more particularly to a method of and apparatus for catalytic conversions in which adsorptive materials having a large internal pore area are employed in finely-divided state as a catalyst.

One of the primary objects of the present invention is to provide a process which will take greater advantage of the activity of such catalysts.

A further object of the invention is to provide an improved method of regenerating such catalysts to remove carbonaceous deposits formed during the conversion process.

While the invention in its broader phases has a more general application, it is particularly adapted for the catalytic conversion of hydrocarbon oils to form motor fuel of high octane rating.

It has heretofore been proposed to form high octane gasoline from higher boiling oils by cracking the oil in the presence of adsorptive material, such as activated clays or synthetic gels of the same or different composition. According to one general method of procedure, the catalyst in finely-divided state is mixed with the oil vapors to be cracked and the resulting mixture passed through a reaction zone. Following the cracking treatment, the catalyst is separated from the cracked products and the cracked products fractionated to separate the motor fuel therefrom. The catalyst separated from the cracked products is then regenerated to remove combustible deposits formed during the cracking treatment and is then returned to the cracking zone for further use.

It has been found that the rate of cracking within the cracking zone depends, within certain limits, on the rate of diffusion of the oil vapors into and from the catalyst pores. It has been found that this rate of reaction may be accelerated by periodically purging the catalyst particles of absorbed vapors so as to present new surfaces for contact with the unadsorbed oil.

This is accomplished, according to the preferred embodiment of the invention, by periodically blasting the catalyst particles with high velocity streams or jets of gas during its passage through the cracking zone. The gases used for the purging treatment may comprise the oil vapors to be cracked or it may be an inert gas such as steam, nitrogen, carbon dioxide, and the like.

Having set forth the general nature and objects, the invention will be best understood from the more detailed description hereinafter in which reference will be made to the accompanying drawing which is a diagrammatic illustration of an apparatus suitable for carrying the invention into effect.

Referring to the drawing, the reference character 10 designates a charge line through which the oil to be cracked is introduced into the system. This oil may be any suitable cracking stock such as a gas oil or it may be topped or reduced crude. The oil introduced through line 10 is forced by means of pump 11 to a vaporizing coil 12 located in furnace 13 wherein it is heated to a temperature sufficient to vaporize a substantial portion of said oil. The products from the vaporizing coil 12 are then passed through line 14 to a separator 15 wherein the vapors separate from any unvaporized residue. The residue is removed from the bottom of the separator 15 through line 16.

The vapors liberated in the separator 15 pass overhead through lines 17 and 18 to a dispersion chamber 19 wherein they admix with finely-divided adsorbent catalyst introduced therein by any suitable means such as a worm 20.

The catalyst introduced into the oil vapors may be any suitable adsorptive material capable of effecting the desired conversion. For example, in the cracking of oils such catalyst may comprise activated clays, such as acid treated bentonite clays, or synthetic gels of silica-alumina, silica-magnesia, silica-zirconia and boria-alumina. These activated clays and gels are characterized by having a porous structure capable of adsorbing considerable quantities of the oil vapors. The amount of catalyst so introduced may be controlled within wide limits and may range, for example, between 1 and 20 parts of catalyst per part of oil by weight.

The mixture of oil vapors and catalyst formed in the dispersion chamber 19 immediately adjacent the end of the worm 20 discharges through line 21 into a vertical column 22 through which it passes in an upward direction. This vertical tower 22 forms an initial cracking zone and should be maintained at a cracking temperature, such as, for example, between 750° F. and 1000° F. This heat may be supplied directly to the column 22 or it may be supplied from the heat of the catalyst introduced into the oil vapors, or the oil vapors may be heated to the required reaction temperature in the vaporizing coil 12.

The oil vapors and catalyst are retained within the vertical column 22 for a period sufficient to obtain a substantial amount of cracking and the resulting stream is then passed downwardly through another conduit or tube 23 of reduced cross-sectional area so that the velocity of the stream is materially increased.

In accordance with the present invention, the return bend 24 connecting the column 22 with the return conduit 23 has a relatively short radius so that the catalyst particles contained in the stream tend to be thrown to the outer wall of the bend by centrifugal action.

Further in accordance with the present invention, there is introduced at spaced points along the return bend 24 a plurality of jets of high velocity gas which impinges upon the catalyst particles and tends to purge them of adsorbed reaction products contained therein. As illustrated, a gas from line 25 is passed through a plurality of branch lines leading to the return bend 24 and through which the gases pass into the return bend in the form of high velocity jets. This gas may consist of oil vapors liberated in the separator 15. To this end, manifold line 25 may be connected by means of line 26 to line 17 which removes overhead vapors from the separator 15. In lieu of using oil vapors as a purging medium, an extraneous gas of the character heretofore mentioned may be introduced into the manifold line 25 through line 27.

The suspension after passing downwardly through the restricted conduit 23 passes through another return bend 28 to a second vertical column or tower 29 of enlarged cross-sectional area in which additional cracking of the oil vapors is carried out. The bottom return bend section 28 may also be provided with a plurality of jet openings leading to branch lines 31 which in turn connect with manifold line 32. An inert gas of the character before mentioned may be introduced into the manifold line 32 through line 33 or a portion of the oil vapors from the separator 15 may be passed to manifold line 32 through line 34.

The suspension of oil vapors and catalyst after passing through the second vertical column 29 passes through another return bend section 35 of relatively short radius and into which additional purging gas may be introduced at a plurality of spaced points through branch lines 36 leading from the upper manifold line 25. The stream of oil vapors and catalyst then passes from the return bend section 35 downwardly through a tube 37 of reduced cross-sectional area at increased velocity to maintain the catalyst in suspension. The stream of oil vapors and catalyst after passing downwardly through tube 37 passes through another return bend section 38 through which additional purging gas may be introduced at a plurality of spaced points through branch lines 39 leading from a common manifold line 32.

The suspension after passing around the return bend section 38 passes upwardly through a third vertical column 41 in which additional cracking is carried out. The products from the vertical column 41 may then discharge through line 42 to a suitable separator such as a cyclone separator 43 wherein the catalyst is separated from the cracked products. While I have shown three vertical columns 22, 29 and 41 which form the principal cracking sections of the equipment, it will be understood that two or more of such columns may be provided if desired to provide the necessary contact time between the oil vapors and the catalyst. The cracked products separated in the separator 43 then pass through line 44 to suitable fractionating equipment 45 in which the products are fractionated to condense insufficiently cracked constituents as condensate. The condensate formed in the tower 45 may be removed from the bottom thereof through line 46. Vapors remaining uncondensed in the fractionating tower 45 pass overhead through line 46 to a condenser 47 in which the desired distillate product is liquefied. Products from the condenser 47 may then pass to a receiver 48 in which the distillate formed in the condenser 47 separates from normally gaseous constituents formed in the cracking operation. The liquid distillate is withdrawn from receiver 48 through line 49. If desired, a portion of this distillate may be returned to the top of the fractionating tower through line 51 and pump 52' to control the temperature at the top section of the tower.

If desired, the fractionating tower 45 may be provided with suitable trap-out trays (not shown) for collecting the plurality of fractions of oil therein.

Returning to the separator 43, the catalyst separated from the cracked products therein discharges through conduit 52 into a catalyst hopper 53 from whence it may be passed through a suitable feeding device such as a rotary valve 54 into a stream of regenerating gas introduced through line 55. This regenerating gas may be any oxidizing gas suitable for burning the carbonaceous deposits from the catalyst. For example, the regenerating gas may be air or air diluted with inert gas such as steam, carbon dioxide, spent combustion gases, and the like. The mixture or suspension of spent catalyst and regenerating gas formed in line 55 then passes to a regenerating unit which, as illustrated, is of the same construction as the cracking unit. For purposes of brevity, therefore, detailed description of the flow of the regenerating gas and catalyst through the regenerating circuit will be omitted and the parts in the regenerating circuit corresponding to those in the cracking circuit will be indicated by prime numbers.

Briefly, the stream of regenerating gas and catalyst from line 55 flows upwardly through a vertical column 22' and then to return bend section 24' into which a plurality of jets of purging gas is introduced at spaced points. The stream of regenerating gas from the return bend section 24' then passes downwardly through the tube 23' to the bottom return bend section 28' into which additional purging gas is introduced at spaced points. The products after passing through return bend section 28' then pass upwardly again to a second regenerating tower 29' to a third return bend 35' into which additional purging gas is introduced. The stream then passes downwardly through a tube 37' of reduced cross-sectional area and thence through return bend section 38' to the third vertical column 41' in which the regeneration is completed.

The purging gas introduced into the return bend sections of the regenerator may be at a temperature materially below the temperature of the regenerating stream to absorb heat liberated during the regeneration, and to prevent the temperature from exceeding a point which would deactivate the catalyst. For example, the velocity of flow of the catalyst through the first vertical tower 22' may be regulated so that the temperature in this section of the tower does not exceed the deactivating temperature. At the top of the tower the cool purging gas may be introduced to bring the temperature of the regenerating stream down to a point where further regeneration can be carried out without deactivating the catalyst.

The product from the third regenerating column 41' is removed from the top thereof through line 56 and is passed to a suitable separator such as a cyclone separator 57 in which the regenerated catalyst is separated from the regenerating gas. The regenerating gas separated in the separator 57 is removed therefrom through line 58 and may be passed to suitable heat recovery equipment such as a waste heat boiler for removing the sensible heat therefrom before being vented to the atmosphere. If desired, a portion of this gas may be cooled and then recycled to the inlet of the regenerator as a diluent for the air or other oxidizing gas employed in carrying out the regeneration. The regenerated catalyst separated from the regenerating gas in separator 57 discharges through conduit 59 into a catalyst hopper 60 from which it is returned by means of the worm 20 back to the cracking circuit.

From the above description, it will be understood that the invention contemplates a conversion and regenerating process in which the finely-divided adsorptive catalysts is suspended in a gaseous stream which travels through a treating zone at alternate high and low velocities and that the catalyst is subjected to a blowing action by a purging gas while changing from high velocity to low velocity and from low velocity to high velocity. This treatment tends to free the catalyst portion of adsorbed constituents retained therein and to expose fresh surfaces of catalyst for the treating process.

Having described the preferred embodiment of the invention, it will be understood that it embraces such other variations and modifications as come within the spirit and scope thereof.

I claim:

1. A process for the catalytic conversion of hydrocarbons which comprises mixing a finely-divided adsorptive catalyst with the oil vapors to be converted, passing the resulting mixture through a conversion zone, periodically purging the adsorptive catalyst of adsorbed products collected during passage through said zone, thereafter separating the cracked products from the catalyst, and fractionating the products to segregate the desired product therefrom.

2. In the process defined by claim 1, the further improvement which comprises impinging a plurality of high velocity gas streams against the catalyst particles at periodic intervals during passage through the conversion zone to thereby purge the same of adsorbed products contained therein.

3. A process for the catalytic conversion of hydrocarbons which comprises mixing a finely-divided adsorptive conversion catalyst with the hydrocarbons to be converted, passing the resulting mixture upwardly through a plurality of conversion zones of relatively large cross-sectional area, passing the mixture of hydrocarbons and catalyst from one of said conversion zones to another at relatively high velocity through a path of reduced cross-sectional area, and impinging jets of high velocity gas against the catalyst particles passing from one of said conversion zones to another.

PAUL W. CORNELL.